(12) United States Patent
Books et al.

(10) Patent No.: US 12,434,305 B2
(45) Date of Patent: Oct. 7, 2025

(54) CUTTING INSERT

(71) Applicant: VARGUS LTD, Nahariya (IL)

(72) Inventors: Baruch Books, Kfar Kradim (IL); Evgeni Tulchinsky, Haruvin (IL); Rafael Morgulis, Karmiel (IL)

(73) Assignee: VARGUS LTD., Nahariya (IL)

( * ) Notice: Subject to any disclaimer, the term of this patent is extended or adjusted under 35 U.S.C. 154(b) by 0 days.

(21) Appl. No.: 18/565,213

(22) PCT Filed: Jun. 3, 2022

(86) PCT No.: PCT/IB2022/055191
§ 371 (c)(1),
(2) Date: Nov. 29, 2023

(87) PCT Pub. No.: WO2022/259106
PCT Pub. Date: Dec. 15, 2022

(65) Prior Publication Data
US 2024/0253128 A1 Aug. 1, 2024

Related U.S. Application Data

(60) Provisional application No. 63/197,457, filed on Jun. 6, 2021.

(51) Int. Cl.
*B23B 27/16* (2006.01)
*B23B 27/06* (2006.01)

(52) U.S. Cl.
CPC ......... *B23B 27/1611* (2013.01); *B23B 27/065* (2013.01); *B23B 2200/049* (2013.01); *B23B 2200/085* (2013.01)

(58) Field of Classification Search
CPC ........... B23B 27/1611; B23B 2200/049; B23B 27/141; B23B 2200/085; B23B 2200/125; B23B 27/065; B23B 2200/087; B23B 2200/3663; B23B 2205/12;
(Continued)

(56) References Cited

U.S. PATENT DOCUMENTS

2013/0336734 A1* 12/2013 Morgulis ............ B23B 27/1622
407/113
2021/0260669 A1* 8/2021 Fukuhara ............ B23B 27/1611
(Continued)

OTHER PUBLICATIONS https://www.difference.minaprem.com/machining/difference-between-positive-rake-and-negative-rake/ website visited Nov. 21, 2022 Minaprem (Jan. 26, 2018).

*Primary Examiner* — Sara Addisu
(74) *Attorney, Agent, or Firm* — Jose Cherson Weissbrot

(57) ABSTRACT

Disclosed is a cutting insert having a generally polygonal primary body having a primary body base connected to an opposing and similarly-shaped body face through a plurality of primary flank portions extending there between. The cutting insert further includes at least one cutting protrusion extending away from at least one of the primary flank portions, and merging therewith. The cutting protrusion includes a rake face coplanar and extending away from the adjacent primary flank portions, and an edge portion extended towards a cutting flank portion. The cutting protrusion further includes a tip flat extending between a rake front from a protrusion tip towards a rake root portion, adjacent one of the primary flank portions.

4 Claims, 7 Drawing Sheets

(58) Field of Classification Search
CPC ..... B23B 2205/16; B23B 27/00; B23B 27/16; B23B 27/1614; B23B 2200/126; B23B 2205/04

See application file for complete search history.

(56) References Cited

U.S. PATENT DOCUMENTS

2023/0234143 A1\* 7/2023 Fukuhara ................. B23B 1/00
2025/0001507 A1\* 1/2025 Yoshida ................. B23B 27/10

\* cited by examiner

CUTTING INSERT

CROSS-REFERENCE TO RELATED APPLICATIONS

This application is national-stage application of PCT/IB2022/055191, filed on Jun. 3, 2022, which claims the benefit of U.S. provisional patent application No. 63/197,457, filed on Jun. 6, 2021, the contents of which are incorporated by reference in their entirety.

BACKGROUND

Background of the disclosure is for informational purposes only and does not necessarily admit that subsequently mentioned information and/or publications are prior art.

Generally, cutting inserts [herein below "Cutting inserts"] are used in turning operations to carve screw thread[s] onto an internal and/or external envelope of a generally cylindrical work piece. However, work pieces may be of any desired cross-section shape.

Threading operations are rather demanding on inserts, holders, and machines, demanding good chip control, thread quality and consistency, low insert wear [to help thread quality and consistency], and long tool life. However, threading operation exerts high machining forces concentration, at the weakest area of the insert, which is the cutting tip.

To reduce cutting loads, prior-art groove/thread inserts are shaped with a "positive" land, immediately next to a "cutting edge thereof. See, for example, U.S. Pat. No. 7,909,546B2, disclosing, inter-alia, " . . . the present invention employs a thread cutting insert . . . an inclined face of the first step that continues to the thread cutting edge 7 is a narrow positive land with a moderate inclination angle . . . " [See FIG. 3, Prior Art U.S. Pat. No. 7,909,546B2].

Prior-art publication, discloses, inter-alia, " . . . an insert for thread cutting . . . ", Prior-Art, JP2006123041A, shows a perspective view a detail plan view of a cutting tip and cross-sections through the cutting tip showing an acute-angled land.

While acute angled/positive rake lands offer good chip removal initially, they suffer from heat concentration, and lower strength, the sharper the acute angle becomes. They may dull faster, thus lowering consistency of thread cutting, and lowering tool and insert lives.

Therefore, there has been increasing interests towards using "negative" land, immediately next to a "cutting edge" thereof due to certain advantages provided by them such as for example, such negative lands offer a strong tool tip, which makes the tool more resilient under impact loading, resists plastic deformation at high cutting temperature, and provides longer tool life.

However, there has been certain shortcomings observed due to these negative lands. For example, such negative cutting angle increases cutting forces, and pressure associated therewith, which may, result in an unwanted movement of the insert relative to the pocket, in particular against a rotational movement about a center axis when using a central clamping screw.

Therefore, it is an intention of the present disclosure to provide a cutting insert having negative land, in particular for threading operations, which while allowing a high rigidity of the cutting tool, avoids any shifting or rotation thereof during use such that a high accuracy in positioning of the cutting edges against the work-piece, is maintained.

SUMMARY

One aspect of the present disclosure generally concerns an exemplary cutting tool for performing thread turning operations. The cutting tool includes a tool holder and a thread cutting insert adapted to be securely engaged thereon to the tool holder. The tool holder includes a holder body defined by a top face, a bottom face and two opposed longitudinally extending side faces extending generally parallel to each other between a front end and a back end. Further, the tool holder includes a recess defining an insert pocket configured within one of its side faces. The insert pocket includes a base surface and a plurality of support walls extending at a predetermined angle there from the base surface.

The Cutting insert includes a generally polygonal primary body having a primary body base connected to an opposing and similarly-shaped body face through a plurality of primary flank portions extending there between. The cutting insert further includes at least one cutting protrusion extending away from at least one of the primary flank portions, and merging therewith. The at least one cutting protrusion includes a rake face coplanar and extending away from the adjacent primary flank portions, and an edge portion extended towards a cutting flank portion.

The rake face generally includes a tip flat extending between a rake front from a protrusion tip towards a rake root portion, adjacent one of the flank portions. The at least one cutting protrusion is angled relative to the adjacent flank portion such that an angle between the rake face and a normal to the adjacent flank portion is smaller than an angle between the same normal and the tip flat of the cutting protrusion.

In operation, the Cutting insert is releasably secured into said recess by one or more clamping means such as a center screw threadably engageable with a transverse bore in the holder, such that the at-least one cutting protrusion extends out of the holder and is adapted to perform a threading operation onto a work-piece.

Preferably, the Cutting insert includes three cutting protrusions and the primary body is generally triangular in shape.

Additionally, the plurality of flank portions of the Cutting insert includes at-least one rear flank portion generally on a side opposite to one of the cutting protrusion, and facing away there from.

Further, the rear flank portion includes a base flank extending away from the body base towards the body face, and a top flank extending away from the body face towards the body base to meet the base flank at a middle corner. The base flank is positioned at an angle $\beta$ relative to the body base to define a base angle. The top flank is positioned at an angle $\gamma$ relative to the body base to define a face angle such that the angle $\beta$ is generally larger the angle $\gamma$.

Particularly, the base angle $\beta$ ranges between 60° and 120° and preferably ranges between 86° to 95°

Further particularly, the face angle $\gamma$ ranges between 30° and 80° and preferably ranges between 36° to 45°

Preferably, at least one of the support walls and the base surface of the insert pocket defines a tangential angle (Figure US20240253128A1-20240801-P00001) there between.

Further, the tangential angle (Figure US20240253128A1-20240801-P00002) ranges between 25° and 85° and preferably ranges between 37° to 46° such that a top flank of at least one of the rear flank portions is abutted and/or locked against the corresponding support wall. Such an abutment and/or locking is similar to a dove tail locking mechanism and may therefore be called as a dovetail abutment.

Particularly, the edge portion includes a first flat side edge portion extending towards a second flat side edge portion through a central arc shaped edge portion.

Optionally, the protrusion tip is honed for a smooth edging.

Preferably, the protrusion tip is defined only by the central arc shaped edge surface.

Alternatively, the protrusion tip is defined by the entire edge portion including the first flat side edge portion, the second flat side edge portion and the central arc shaped edge portion.

Another aspect of the present disclosure concerns a Cutting insert having a generally polygonal primary body including a primary body base connected to an opposing, generally parallel and similarly-shaped body face through a plurality of primary flank portions extending there between. The cutting insert further includes at least one cutting protrusion extending away from at least one primary flank portions and merging therewith. The cutting protrusion includes a rake face coplanar and extending away from one of the adjacent flank portions, and an edge portion extended towards a cutting flank portion. The rake face generally includes a tip flat extends between a rake front at a protrusion tip towards a rake root portion, adjacent the primary flank portion. The cutting protrusion is angled relative to the primary flank portion, such that an angle between the rake face and a normal to the adjacent primary flank portion is larger than an angle between the same normal and the tip flat of the cutting protrusion.

Further, the plurality of flank portions of the cutting insert includes at-least one rear flank portion generally opposing one of the cutting protrusions and facing away there from. Furthermore, the rear flank portion includes a base flank extending away from the body base towards the body face, and a top flank extending away from the body face towards the body base to meet at a middle corner, with the base flank. The base flank is positioned at an angle β relative to the body base to define a base angle. The top flank is positioned at an angle γ relative to the body base to define a face angle such that the angle β is generally larger the angle γ.

Particularly, the base angle β ranges between 60° and 120° and preferably ranges between 86° to 95°

Further particularly, the face angle γ ranges between 30° and 80° and preferably ranges between 36° to 45°

In addition to the exemplary aspects and embodiments described above, further aspects and embodiments will become apparent by reference to the figures and by study of the following detailed descriptions.

BRIEF DESCRIPTION OF THE DRAWINGS

Exemplary and/or illustrative embodiments of the present disclosure will be presented herein below in the following figures, by way of example only. The present disclosure may be best understood from the following detailed description when read in connection with the accompanying drawings. In the drawings, like portions have the same reference numerals. Modifications or alteration of a generally similar portion and/or element, will be identified with the same numeral, appended by a letter, such as Hand 77, left hand 77 l, right hand 77 r.

It should be emphasized that according to common practice, various features of the drawings are not drawn to scale unless otherwise indicated. On the contrary, dimensions of various features, and/or the features themselves, may be expanded and/or reduced and/or roughly shown and/or omitted entirely, to show details of particular components, in a purpose that the present disclosure may become more fully understood from the detailed description and the accompanying schematic figures. Reference will now be made to the accompanying drawings, in which.

DETAILED DESCRIPTION

As required, a schematic, exemplary-only embodiment of the present disclosures disclosed herein; however, it is to be understood that the disclosed embodiment is merely exemplary of the present disclosure, which may be embodied in various and/or alternative forms. Specific structural and functional details disclosed herein are not to be interpreted as limiting, but merely as a basis for the claims and as a representative basis for teaching one skilled in the art to variously employ the present disclosure in virtually any appropriately detailed structure.

Exemplary embodiments may be adapted for many different purposes and are not intended to be limited to the specific exemplary purposes set forth herein. Those skilled in the art would be able to adapt the exemplary-only embodiment of the present disclosure, depending for example, on the intended use of adapted embodiment. Moreover, examples and limitations related therewith brought herein below are intended to be illustrative and not exclusive. Other limitations of the related art will become apparent to those of skill in the art upon a reading of the following specification and a study of the related figures.

The present application discloses a cutting tool holder and a cutting insert for performing a threading operation onto a work piece. In accordance with the present invention, the cutting insert is a hard, wear resistant cutting insert having a negative rake land, that allows the possibility of providing a high strength for working on generally hard materials such as, for example Including, but not limited to, HSS-high speed steel, hard alloys, titanium alloys, etc. The cutting insert further includes a dovetail abutment/locking mechanism so as to securely hold it within an insert pocket of a tool holder such that a shift and/or movement of the insert within the tool holder is avoided and thereby providing high rigidity operation while maintaining an accurate positioning and reducing a cycle time. Such an insert while preferably adapted along within its own holder, may also be used with any conventional holder known in the art and suitable to use therewith. It is to be understood that unless otherwise indicated this invention need not be limited to any specific material and/or operation. Moreover, it should be understood that embodiments of the present invention may be applied in combination with various known tools holders, and/or pockets, to achieve any desired application.

Figure 1:
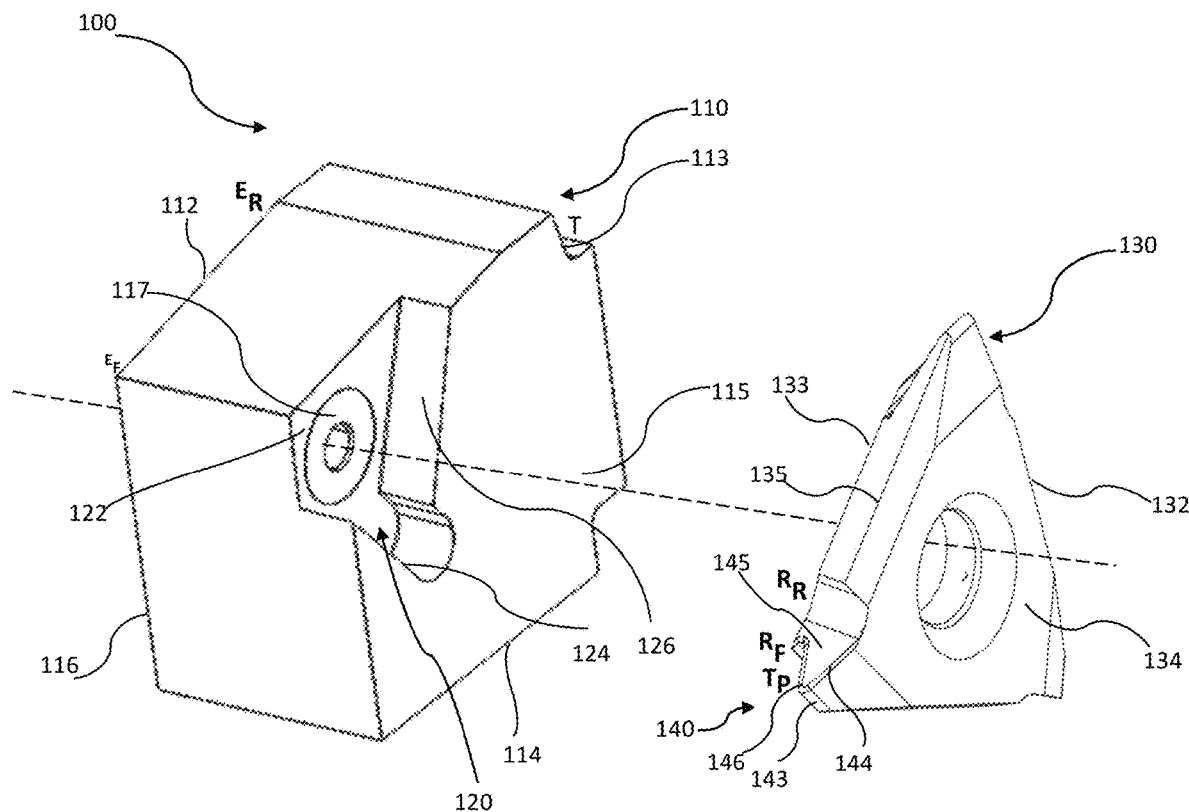
FIG. 1 illustrates an exemplary cutting tool holder holding the cutting insert in accordance to an embodiment of the current disclosure.

Referring now to FIG. 1, a first, exemplary-only, illustrative embodiment of the present disclosure demonstrates a descriptive-only, exemplary, cutting tool 100. The cutting tool 100 includes a descriptive-only, exemplary, tool holder 110. The tool holder 110 is of a, generally elongated prism shape, extending from a front-end EF generally rearwardly towards a rear end ER of the tool holder 110. The tool holder 110 further includes a first tail T extending away forwardly in a direction generally away from the rear end ER and may be adjustably located onto a machining apparatus [not shown] by any known and/or discovered, means.

The tool holder 110 includes a holder body 112 defined by a top face 113, a bottom face 114, and two opposed longitudinally extending side faces 115, 116 extending generally parallel to each other between the front end EF and the rear end ER. Further, the tool holder includes a recess 117 defining an insert pocket 120, configured within one of its sides faces 115, 116. The insert pocket 120 includes a base support surface 122 and a plurality of support walls 124, 126, extending upwardly there from.

The cutting tool 100 further includes a cutting insert 130 adapted to be releasably held, during operation, by the dedicated, descriptive-only, exemplary, tool holder 110. The Cutting insert 130 comprises a primary body 132. The primary body 132 is a generally polygonal shaped body, illustrated as a triangular shaped body as an exemplary embodiment. The primary body 132 is defined by a primary body base 133 connected to an opposing and similarly-shaped primary body face 134 through a plurality of primary flank portions 135 extending there between. The Cutting insert 130 further includes a plurality of cutting protrusions 140 merging therewith and extending away there from at least one of the primary flank portions 135. Each of the plurality of cutting protrusion 140 includes a rake face 145 which is generally coplanar and merges with an adjacent primary flank portion 135, and is extended towards a cutting flank portion 143 through an edge portion 144. The cutting protrusion 140 further includes a tip flat 148 extending from a rake front RF defining a protrusion tip TP at the edge portion 144, towards a rake root portion RR, adjacent the primary flank portion 135. The cutting protrusion 140 is angled relative to the primary flank portion such that a rake angle Ø [not shown] between the rake face 145 and a normal N to the primary flank portion 135 is smaller than a land angle Q [not shown] between the same normal N and the tip flat 146 of the cutting protrusion 140.

Figure 2A:
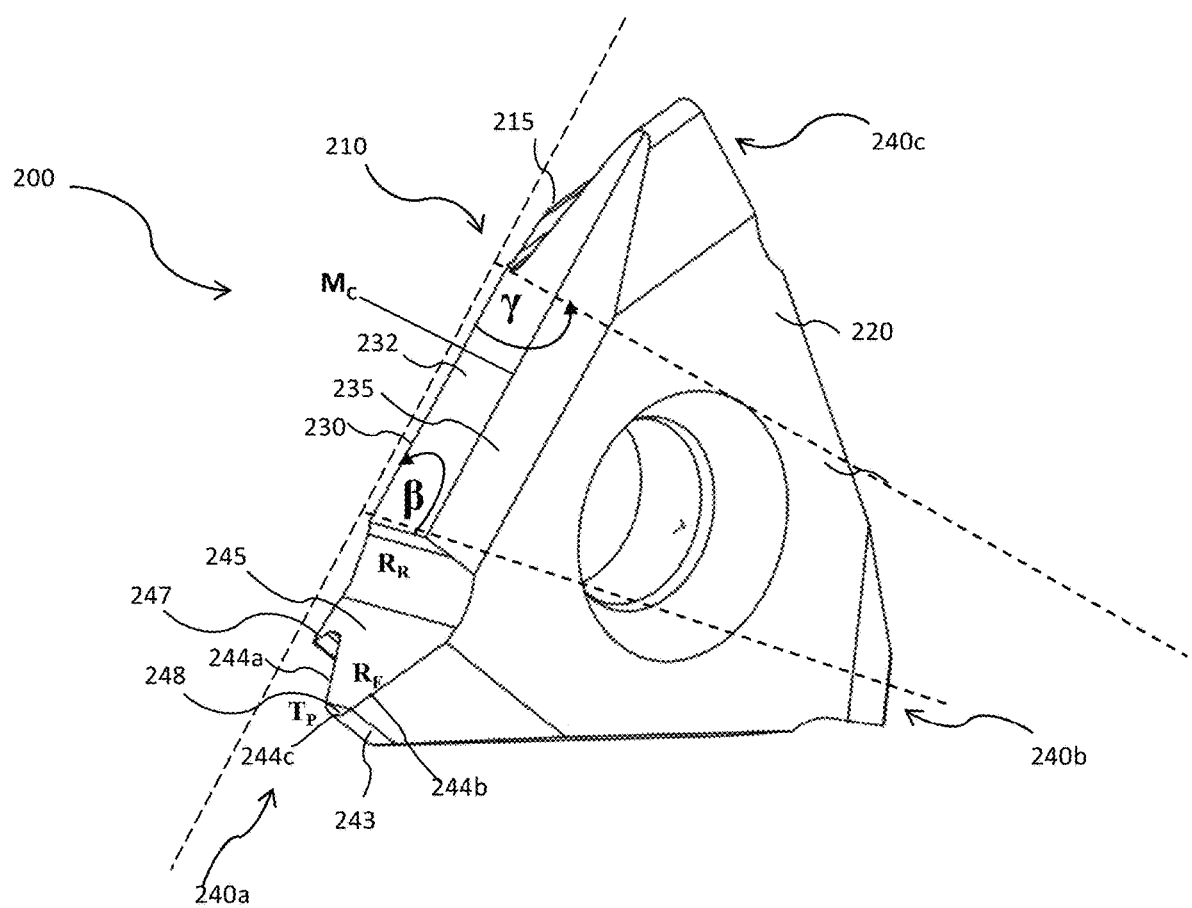
FIG. 2a illustrates a general schematic perspective view of a cutting insert in accordance to a first preferred embodiment of the current disclosure.
Figure 2B:
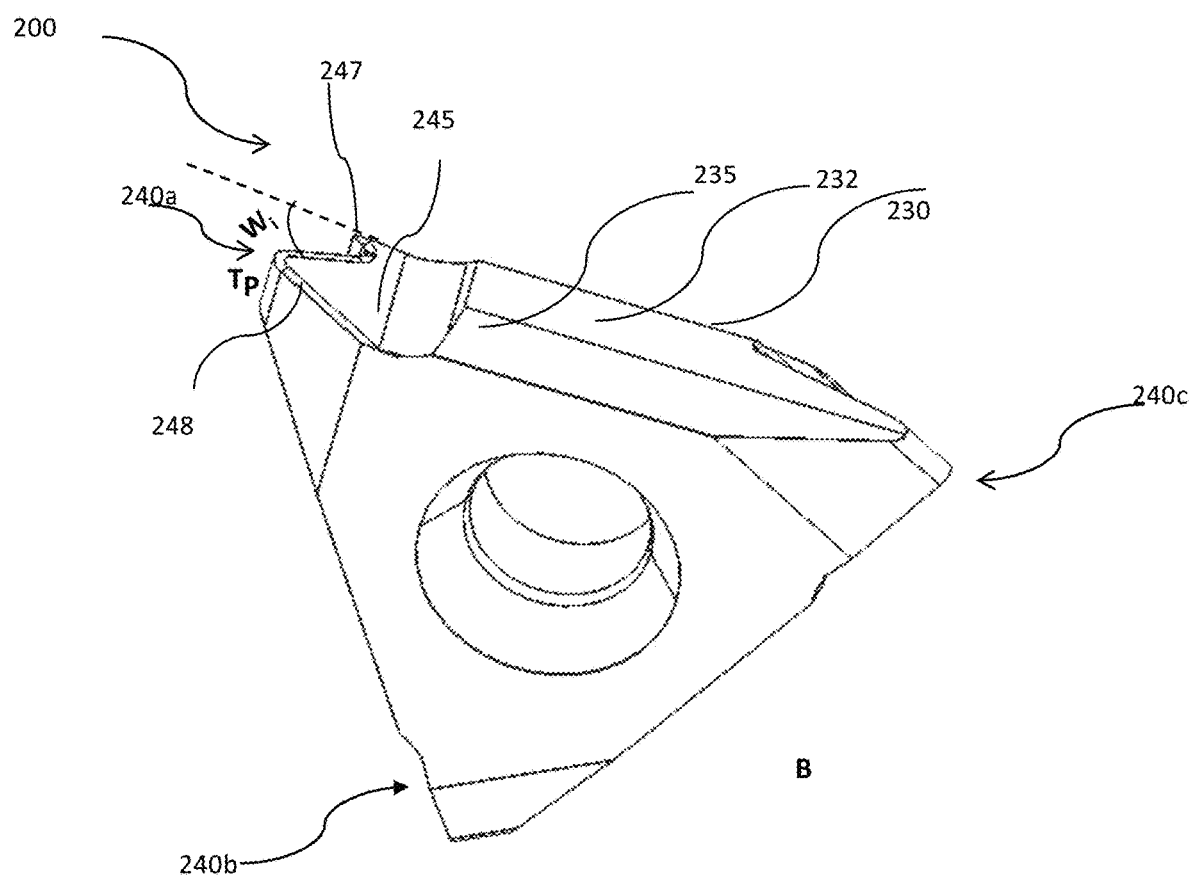
FIG. 2b illustrates a general schematic perspective view of a cutting insert in accordance to a second preferred embodiment of the current disclosure.

FIGS. 2a through 2b, illustrate an exemplary cutting insert 200 of the present invention in accordance to various embodiments. As disclosed earlier, the cutting insert 200 includes a generally polygonal-shaped insert primary body 210. In the disclosed example, the primary body 210 is in the shape of a triangular polygonal shape. However, in other embodiments, the polygonal shape may be in the form of any possible shape such as for example, a rectangular, a square, a rhombic, or any other similar shape. The Cutting insert 200 is generally formed of a hard, abrasion resistant material, such as including but not limited to a tungsten carbide, metallic compounds, HSS, ceramic based cutting materials such as ceramic materials, ceramic alloys and/or any other known or discovered hard and tough material and/or compound". The cutting insert's 200 material may be coated with one or more materials such as including but not limited to diamond, and/or diamond-like compounds, including thin wafers of hard material disposed onto cutting material, CBN (Cubic Boron Nitride) and/or any other known or discovered hard and tough substance suitable to be used as a coating material. The cutting insert 200 is generally formed by press-molding and sintering a powdered cutting material such as tungsten carbide. However, in some embodiments, the cutting insert 200 may also be produced by injection molding. In yet other embodiments, the cutting insert 200 may be produced using any suitable mechanism conventionally known in the art.

The primary body 210 includes a generally triangular shaped primary body base 215 connected to an opposing and generally parallel primary body face 220 through a plurality of primary flank portions 230 extending there between. The number of primary flank portions 230 is generally same as a number of sides of the primary body 210. For example, within the illustrated examples, there are three primary flank portions 230. Each of the primary flank portions 230 includes a base flank 232, respectively, extending away from the primary body base 215 towards the primary body face 220, and a top flank 235 extending away from the primary body face 220 towards the primary body base 215 to meet at the corresponding base flank 232 at corresponding middle corner portion MC. Each of the base flanks 232 is positioned at an angle relative to the primary body base 220 defined as a base angle β. Each of the top flanks 235 is positioned at an angle relative to the body base 220 defined as a face angle γ such that the angle β is generally larger than the angle γ. In one embodiment, the base angle β ranges between 60° and 120° and preferably ranges between 86° to 95°. Further within such embodiments, the face angle γ ranges between 30° and 80° and preferably ranges between 36° to 45°.

The Cutting insert 200 further includes at least one and preferably, three generally triangular shaped cutting protrusion 240a, 240b, 240c, each extending away from merging therewith one of the primary flank portion 230 such that each of the cutting protrusion 240a, 240b, 240c is positioned in a direction opposite to one of the primary flank portions 230 and each of the two adjacent primary flank portions 230 is associated with one of the three cutting protrusions 240a, 240b, and 240c.

Each of the plurality of cutting protrusions 240a, 240b, 240c includes a rake face 245 which is generally coplanar and merges with one of the primary flank portions 230, and is extended towards a cutting flank portion 243 through an edge portion 244a-244c. The cutting protrusion 240 further includes a tip flat 248 extending from a rake front RF defining a protrusion tip TP at the corresponding edge portion 244a-244c, towards a rake root portion RR, adjacent the primary flank portion 230.

Figure 3:
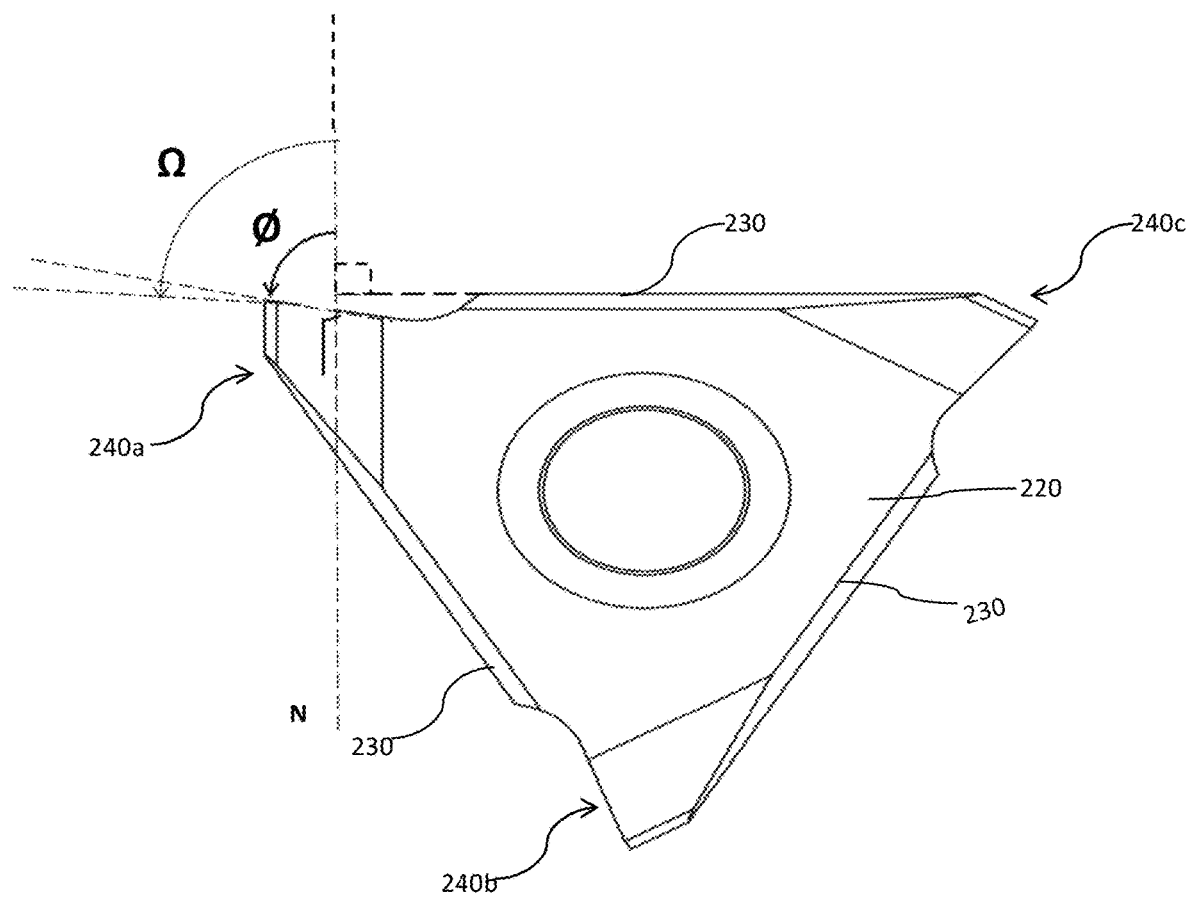
FIG. 3 illustrates a general schematic side view of the cutting insert of the current disclosure.

As illustrated in FIG. 3, the cutting protrusion 240 is angled relative to the primary flank portion 230 such that a rake angle Ø between the rake face 245 and a normal N to the adjacent primary flank portion 230 is smaller than a land angle (Ω) between the same normal N and the tip flat 248 of the cutting protrusion 240. The land angle Ω is an acute angle generally ranging between is 10° and 85° and preferably ranges between 15° to 75°. The rake angle (Ø) ranges is also an acute angle generally ranging between is 20° and 65° and preferably ranges between 30° to 45°.

As illustrated in FIG. 2a, the edge portion 244a-244c includes a first flat edge portion 244a, connected to a second flat edge portion 244b through a central arc shaped edge portion 244c. Further, the tip flat 248 is extended towards the edge portion 244a-244c to define the protruding tip TP which shall engage with and cut threads of a metallic work-piece (not shown). In a preferred embodiment as illustrated in FIG. 2a, the protrusion tip TP is defined only by the central arc shaped edge portion 244c of the edge portion 244a-244c. However, in other embodiments as illustrated in FIG. 2b, the protrusion tip TP is defined by the entire surface of the edge portion 244a-244c including the first flat edge portion 244a, the second flat edge portion 244b and the central arc shaped edge portion 244c such that the protrusion tip TP is defined at the entire periphery of the cutting protrusion 240. Such an embodiment is illustrated in FIG. 2b. In some embodiments, the cutting insert 200 includes a secondary-protrusion 247 in the form of a crest shaped structure, radially extended away from the rake face 245. Such a secondary protrusion 247 form an angle Wi with the cutting protrusion 240.

In a preferred embodiment, the three cutting protrusions 240a, 240b, 240c are identical in shape and configuration. However, in some other embodiments, each of the cutting protrusions 240a, 240b, 240c is configured differently to perform a corresponding threading operation to achieve a different threading and/or grooving geometry, without deviating from the scope of the current disclosure. Further, in some embodiments, the Cutting insert 200 may comprise only one cutting protrusion 240, which is provided between two of the flank portions 230. Thus, the Cutting insert 200 is a 3-positions indexable insert having three different cutting protrusions 240, each having a corresponding protrusion tip TP. Furthermore, in some embodiments, the each of the cutting protrusion may comprise a variable number of protruding tips TP, in the form of a plurality of cutting teeth and/or secondary protrusions 247 configured onto each of cutting protrusion 240. Accordingly, the Cutting insert 200 is a 3-positions indexable insert having three different cutting protrusions 240, each having a corresponding protrusion tip(s) TP.

Figure 4:
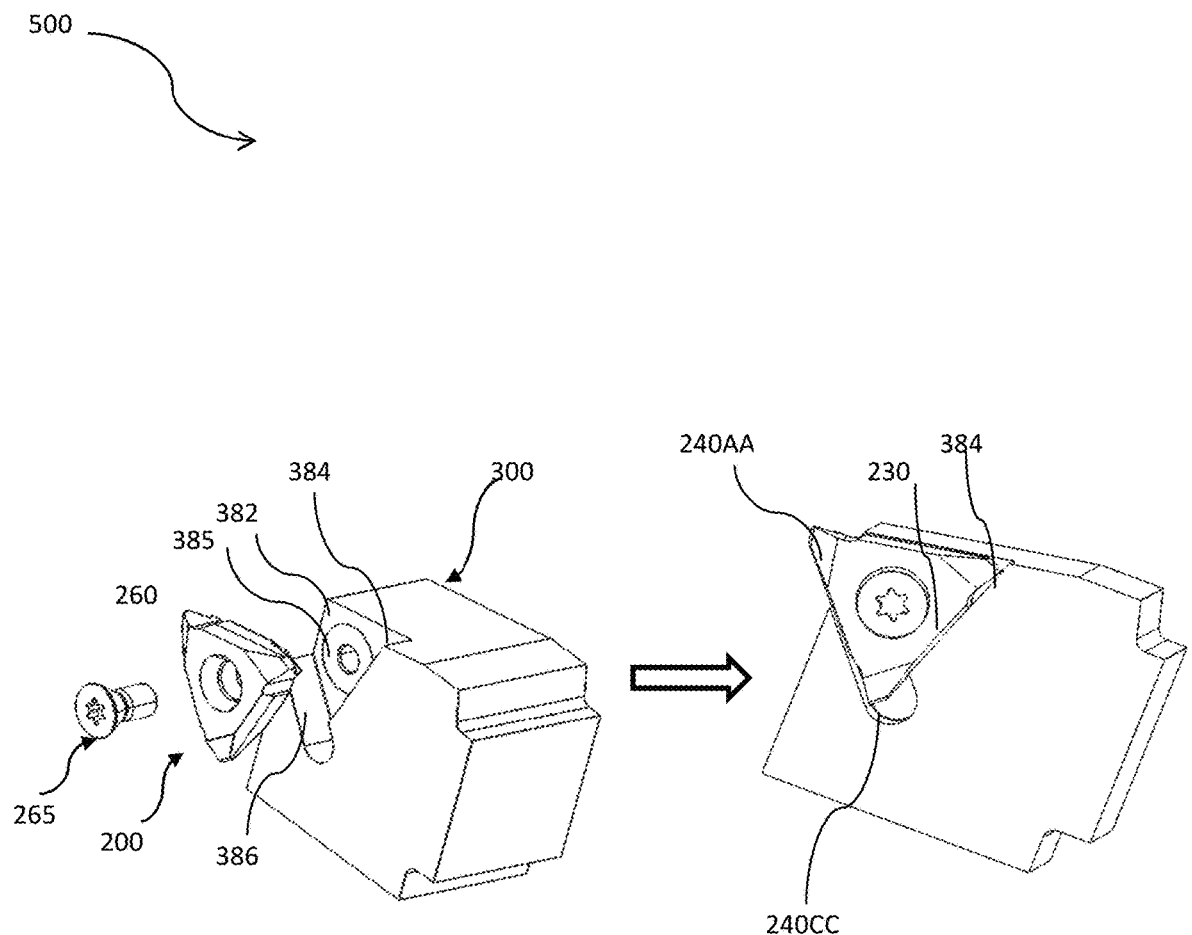
FIG. 4 a illustrates an exemplary positioning of the Cutting insert within an insert pocket of the cutting tool holder of the exemplary-only embodiment of the current disclosure.

FIG. 4 illustrates an exemplary Cutting tool 600 comprising a tool holder 300 of the cutting tool 100 of the current disclosure, provided with an insert pocket 350, adapted to receive the Cutting insert 200 of the current disclosure.

As disclosed earlier, the Cutting insert 200 is adapted to be supported onto the tool holder 300. Accordingly, the insert 200 further includes one or more clamping mechanism 265 for enabling an engagement thereof with the tool holder. In some preferred embodiments, as illustrated, the Cutting insert 200 is provided with a central through hole 260 for receiving a clamping screw 265 there through such that a screw, fastening bolt, or the like, may be used to connect the insert 200 onto the recess/pocket 350 of the tool holder 300. In some embodiments, the insert 200 further includes a clamping wedge, provided for co-operating with the central clamping screw 265. In yet other embodiments, any conventionally known clamping mechanism may be utilized and accommodated within the insert 200 so as to securely and releasably engage it onto the tool holder 300.

Looping back to FIG. 4, the pocket 350 include a base support surface 352 shaped in accordance to the shape of the insert 200. The pocket 350 further includes one or more support walls 380 including a rear support wall 384 and a bottom surface 386, extending there from the base support surface 382. The tool holder 300, including the insert pocket 350 is a one-piece integral formation and is made of a material generally selected from one or more of but not limited to a machined steel or any other suitable hard material. The insert pocket 350 further includes a clamping hole 385 configured thereon the base support surface 382, adapted to receive the clamping screw 265 therein so as to hold the insert 200 onto the holder 300 at the pocket 350.

The Cutting insert 200 when positioned within the pocket 350, is adapted to present one of the cutting protrusion 240 as an active cutting protrusion 240AA, whereas the remaining cutting protrusions, referred to as passive cutting protrusions 240CC, are received within the pocket 350 such that one or more primary flank portions 230 of the Cutting insert 200 is abutted against the one or more support walls 380.

In a preferred embodiment as illustrated in FIG. 4, the one or more support wall 380 is defined at an angle relative to the base support surface 382. Preferably, at least the one of the side support walls 380 and the base support surface 382 of the insert pocket 350 defines a pocket angle (Figure US20240253128A1-20240801-P00002) there between. The pocket angle (Figure US20240253128A1-20240801-P00002) is generally complementary and adapted to interact with a face angle γ of the top flank 235 so as to abut therewith, providing an end stop dovetail locking/abutment to the Cutting insert 200 at at-least one of the rear flank portions 230, when positioned within the insert pocket 350.

Accordingly, the cutting insert 200 is adapted to be inserted within the pocket 350 such that the primary body base 220 is facing towards the base support surface 382 and the primary flank portions 230, and preferably, the top flank portions 235 adjacent the passive cutting protrusions 240CC abuts against the support walls 380 of the pocket 350 to provide a dovetail lock thereat. Such an arrangement and/or abutment between the insert 200 and the pocket 350 prevents any possibility of rotational and/or axial movement of the insert 200 about its central axis C during the use of the tool holder 300 thereby limiting any change in the position of the insert 200 during use and in turn offering a highly accurate threading operation by maintaining a desired axial and radial rake angle of the protruding tip TP against the work piece. Such a preferred embodiment eliminates the need for additional structures such as a clamp to positively lock the insert 200 and also reduces the possibility of failure due to the clamping screw 265.

However, in other embodiment, the support wall 380 may be defined at an angle of 90 degree relative to the base surface 382. The pocket angle (Figure US20240253128A1-20240801-P00002) in such embodiments, is generally complementary and adapted to interact with the base angle β of the base flank 232 so as to abut therewith, providing an end stop to the Cutting insert 200 at at least one of the primary flank portions 230, when positioned within the insert pocket 350. The pocket angle (Figure US20240253128A1-20240801-P00002) in such embodiments ranges between 80° and 90°. In yet other embodiments, the support wall 380 may be defined at any angle relative to the base support surface 382 and still gets abutted to the base flank.

Figure 5A:
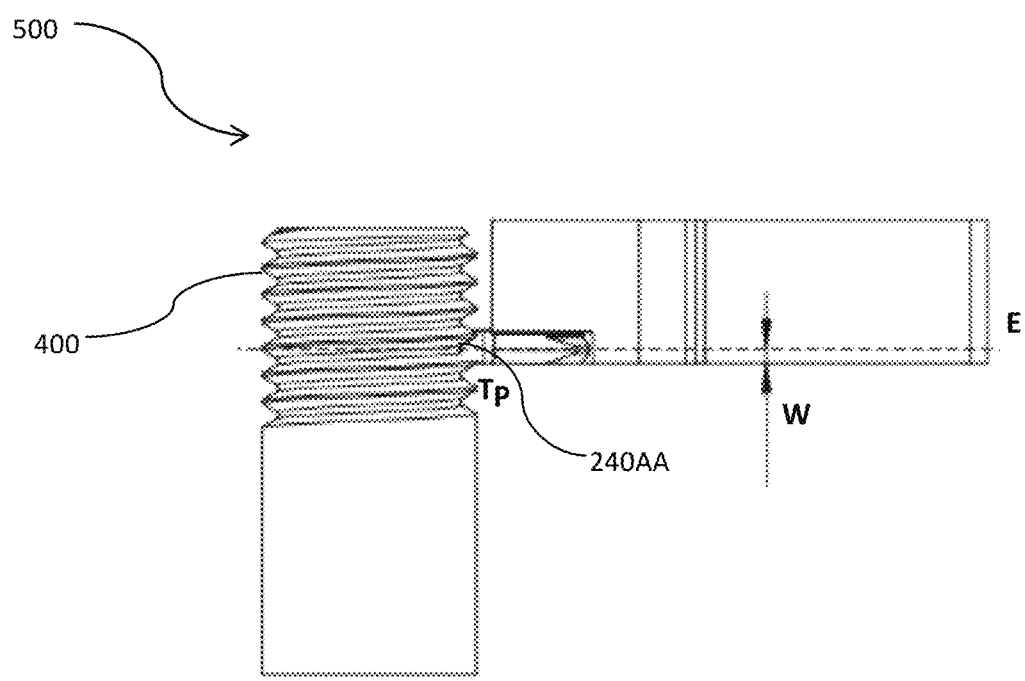
FIG. 5a-5b illustrates machining of a work piece in accordance to an exemplary-only embodiment of the current disclosure.
Figure 5B:
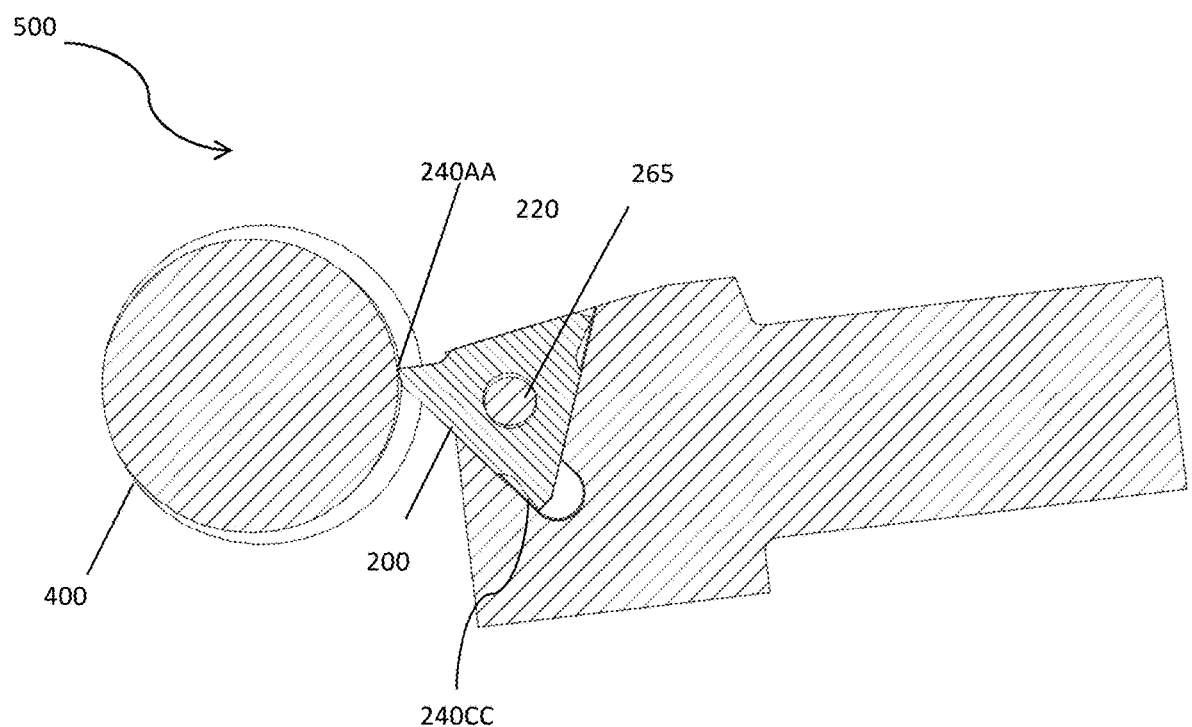

In operation, as illustrated in FIGS. 5a and 5b, the insert 200 is fixedly secured within the pocket 350 of the tool holder 300 such that the active cutting protrusion 240AA at least partially projects away there from an external axial boundary E (shown by a dotted line in FIG. 6a) of the holder 300 and the Projecting tip TP is abutted against a suitable work piece 400, such as a round bar. A width W of a projecting portion generally ranges between 0.5 mm to 1.5 mm and preferably is approximately 1.00 mm. However, the width W may be adjusted on the basis of a depth and/or geometry of the threading to be formed onto the work-piece 400. The work-piece 400 is fed at a predetermined speed in a thread chasing direction, such that the protrusion tip TP of the active cutting protrusion 240AA penetrates a stock material from the work-piece 400, carving away, material chips such that a thread/groove is formed by the Projecting tip TP in the work-piece 400. Accordingly, the work-piece 400 may be fed out in a plurality of cycles so that a thread is formed on the circumferential surface of the work-piece 400 by the protrusion tip TP, and a crest portion of the thread is formed by the secondary protrusions and/or teeth 249 of the cutting protrusion 240, particularly in a last cycle.

The Cutting insert 200 of the current disclosure enables a high machining performance which is determined by the maximum load that the active protrusion 240AA can withstand without causing a damage to the tip TP, before it is damaged. Additionally, the insert 200 also can withstand a high leverage exerted on the cutting protrusion without bending and/or twisting and/or dislodging away from the pocket 350. Accordingly, a high accuracy of the operation is maintained in turn improving the surface precision of the work piece 400.

Although the invention has been described with a certain degree of particularity, it should be understood that various modifications and changes can be made without departing from the spirit and scope of the claimed invention. For example, the Cutting insert 200 can have four or six or more cutting portions instead of three. Furthermore, it will be appreciated that the present invention can also be applied to operations other than threading operations. Instead of clamping screws 265, any known clamping means such as a lever or a pin mechanism can also be used.

While certain exemplary embodiments have been described and shown in the accompanying drawings, it is to be understood that such embodiments are merely illustrative of and not restrictive on the broad present disclosure, and that this present disclosure is not limited to the specific constructions and arrangements shown and described, since various other modifications and/or adaptations may occur to those of ordinary skill in the art.

It is to be understood that individual features shown or described for one embodiment may be combined with individual features shown or described for another embodiment. It is to be understood that some features are shown or described to illustrate the use of the present disclosure in the context of functional segments and such features may be omitted within the scope of the present disclosure and without departing from the spirit of the present disclosure as defined in the appended claims.

What is claimed is:

1. An indexable cutting insert comprising:
a generally polygonal primary body comprising a primary body base, an opposed and similarly-shaped body face with a plurality of primary flank portions extending there between, the plurality of primary flank portions each including a base flank and a top flank adjacent to the base flank, wherein the base flank, respectively, extends away from the primary body base towards the primary body face, and a top flank extends away from the primary body face towards the primary body base to meet at the corresponding base flank at a corresponding middle corner portion;
one or more cutting protrusions, each of the one or more cutting protrusions including a rake face and a tip flat;
wherein
a cutting protrusion in the one or more cutting protrusions extends away from, and includes a rake face that merges therewith, the base flank, the rake face extended towards a cutting flank portion through an edge portion, wherein the cutting flank portion comprises the tip flat extending rearwardly away from a rake front defining a protrusion tip $T_P$ at the corresponding edge portion and towards a rake root disposed on the rake face adjacent the base flank; and
an acute angle ($\varphi$) between the rake face of the cutting protrusion and a normal of the base flank is less than an acute angle ($\Omega$) between the tip flat of the cutting protrusion and the normal of the base flank.

2. The indexable cutting insert of claim 1, wherein
the acute angle ($\varphi$) is greater than or equal to 20 degrees and less than or equal to 65 degrees; and
the acute angle ($\Omega$) is greater than or equal to 10 degrees and less than or equal to 85 degrees.

3. The indexable cutting insert of claim 2, further comprising: one or more secondary cutting protrusions.

4. The indexable cutting insert of claim 3, wherein the plurality of primary flank portions includes at least three primary flank portions.

* * * * *